(12) United States Patent
Murakami et al.

(10) Patent No.: US 6,536,835 B2
(45) Date of Patent: Mar. 25, 2003

(54) DOOR-HARNESS WIRING SYSTEM AND METHOD

(75) Inventors: Akio Murakami, Yokkaichi (JP); Seiji Fukumoto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/077,815

(22) Filed: Feb. 20, 2002

(65) Prior Publication Data

US 2002/0113460 A1 Aug. 22, 2002

(30) Foreign Application Priority Data

Feb. 21, 2001 (JP) ........................................ 2001-044967

(51) Int. Cl.[7] ................................................. B60J 3/00
(52) U.S. Cl. .................... 296/152; 296/152; 296/146.7; 296/146.1; 296/146.5; 174/153 G; 174/65 G; 174/152 G; 49/502; 439/34; 439/248; 439/157
(58) Field of Search ..................... 296/146.7, 146.5; 174/153 G, 65 G, 152 G; 439/34, 248, 157

(56) References Cited

U.S. PATENT DOCUMENTS

| | | | | |
|---|---|---|---|---|
| 4,848,829 A | * | 7/1989 | Kidd ........................... 296/152 |
| 4,882,842 A | * | 11/1989 | Basson et al. ............. 296/146.7 |
| 4,907,836 A | * | 3/1990 | Ueda et al. .................... 296/152 |
| 4,943,109 A | * | 7/1990 | Skrbina et al. ............ 296/146.5 |
| 5,588,260 A | * | 12/1996 | Suzuki et al. ............. 296/146.5 |
| 5,716,044 A | * | 2/1998 | Peterson et al. ............. 296/152 |
| 5,743,010 A | * | 4/1998 | Zaguskin et al. ............. 439/34 |
| 5,902,004 A | * | 5/1999 | Waltz et al. ............... 296/146.9 |
| 5,936,818 A | * | 8/1999 | Maue et al. ................. 361/93.1 |
| 6,000,959 A | * | 12/1999 | Curtindale et al. .......... 439/247 |
| 6,019,418 A | * | 2/2000 | Emerling et al. ......... 296/146.7 |
| 6,019,637 A | * | 2/2000 | Iwata et al. .................. 439/595 |
| 6,079,764 A | * | 6/2000 | Suzuki et al. ................ 296/152 |

(List continued on next page.)

FOREIGN PATENT DOCUMENTS

| | | |
|---|---|---|
| JP | 9-121431 | 5/1997 |
| JP | 10-24778 | 1/1998 |
| JP | 10-81180 | 3/1998 |
| JP | 11-42985 | 2/1999 |
| JP | 2000-16194 | 1/2000 |

OTHER PUBLICATIONS

Patent Abstracts of Japan, vol. 2000, No. 04, published on Aug.31, 2000.
Patent Abstracts of Japan, vol. 1998, No. 08, published on Jun.30, 1998.
Patent Abstracts of Japan, vol. 1998, No. 05, published on Apr. 30, 1998.
Patent Abstracts of Japan, vol. 1997, No. 09, published on Sep. 30, 1997.

*Primary Examiner*—Kiran Patel
(74) *Attorney, Agent, or Firm*—Greenblum & Bernstein, P.L.C.

(57) ABSTRACT

A door module panel is initially mounted with a door harness and is provided with a panel hole at a position where a descending window glass does not interfere. The door harness is wired from a first surface facing a passenger compartment of the door module panel to a second surface facing a door frame through the panel hole. The door module panel has a side face, from a middle portion of which a protruding member is extended and bent towards the door frame. The protruding member includes a harness hole, through which is passed the door harness extending from the second surface of the door module panel. The door harness is then fitted into the harness hole with a grommet. The door frame is provided with a side panel notched with a groove. When the door module panel is incorporated into the door frame, the protruding member fits into the notched groove on the same plane. The door harness thus can be installed very easily.

6 Claims, 4 Drawing Sheets

U.S. PATENT DOCUMENTS

| | | | | |
|---|---|---|---|---|
| 6,139,088 A | * | 10/2000 | Okamoto et al. | 296/146.7 |
| 6,142,556 A | * | 11/2000 | Tanaka et al. | 296/146.7 |
| 6,217,375 B1 | * | 4/2001 | Nagai et al. | 439/34 |
| 6,312,046 B1 | * | 11/2001 | Sora et al. | 296/152 |
| 6,354,651 B1 | * | 3/2002 | Mori | 296/152 |
| 6,381,906 B1 | * | 5/2002 | Pacella et al. | 296/146.7 |
| 6,412,852 B1 | * | 7/2002 | Koa et al. | 296/146.7 |

* cited by examiner

DOOR-HARNESS WIRING SYSTEM AND METHOD

BACKGROUND OF THE INVENTION

1. Field of the Invention

The present invention relates to a wiring system of a door harness. In particular, the wiring system of the invention includes a door module panel initially equipped with a door harness and electrical door components connected to the latter, the door module panel being thereafter mounted into a door frame.

2. Description of Background Information

It usually requires a set of very cumbersome operations for an operator to wire a door harness in a door, connect electrical devices thereto and mount these devices into the door frame. As shown in FIG. 1, the door harness 2 and the electrical devices 3 connected thereto may be initially mounted into a door module panel 5. The door frame 6 may be composed of panels so as to form a substantially rectangular or square parallelepiped shape. The panel of the door frame 6 that faces the passenger compartment is then provided with an opening 6a, the periphery of which may substantially extend to the four surrounding panels of the parallelepiped shape. The opening 6a is then joined to the door module panel 5, so as to close the door frame 6.

The door frame 6 is bound to another body frame of a vehicle through a hinge portion (not shown in figures). The door frame 6 also includes a first side panel 6b, through which the door harness 2 that was initially mounted into the door module panel 5 is led towards the other body frame, and connected to a wire harness wired therein.

The door module panel 5 has a substantially rectangular or square shape, with a first surface turned towards the passenger compartment and a second surface turned towards the inside of the door frame. A lower portion of the door module panel 5 is provided with a panel hole 5a which is located beneath a vertically movable door window glass. A first end portion of the door harness 2 is first wired to the first surface of the door module panel 5 and fixed thereto. A second end portion 2h of the door harness 2 is led out towards the second surface of the door module panel 5 through the panel hole 5a, and is equipped with a grommet 7. The first side panel 6b of the door frame 6 is provided with a side panel hole 6c. The grommet 7 with the harness end is then passed through the side panel hole 6c and fitted thereinto.

FIG. 2 illustrates the above operation in more detail. Specifically, the door module panel 5 is placed in front of the opening 6a of the door frame 6; the second end. portion 2h of the door harness 2 is turned into the opening 6a and passed through the side panel hole 6c, and the grommet 7 is fitted into the side panel hole 6c. Subsequently, the opening 6a is closed with the door module panel 5, and the periphery of the panel is fixed to the door frame 6 in any suitable manner, such as by bolts.

Thus, when the door module panel 5 is initially equipped with the door harness 2 and electrical devices 3—as opposed to being equipped at a later stage—and mounted onto the door frame 6, subsequent operations for harness wiring can be greatly simplified.

However, in the above construction, the door harness 2 initially wired on the door module panel 5 must be inserted into the side panel hole 6c of the door frame 6, and the grommet 7 must be fitted into the hole 6c. The above operation constitutes the most cumbersome part in the door harness wiring work, and further improvements are desired.

For instance, in the above operation, the door module panel 5 is placed in front of the opening 6a of the door frame 6. An operator then extends his hand through a space between the panel 5 and the frame 6, passes the door harness 2 through the side panel hole 6c and fits the grommet 7 into the hole 6c. To facilitate the operation, the space must be made sufficiently large. Further, the second end portion 2h of the door harness 2, which is led out through the panel hole 5a towards the second surface of the door module panel 5, must include an excess portion 2g.

After the second harness end portion 2h is passed through the side panel hole 6c and the grommet 7 is fitted into that hole 6c, the door module panel 5 is fixed to the door frame 6. Before fixing, the excess portion 2g of the door harness 2 must be held near the second surface of the door module panel 5. However, this is not an easy task. Therefore, although the door module panel 5 in the prior art provides an improved door harness wiring system, the most difficult part of the task still remains.

Further, in order to facilitate the operation of inserting the door harness 2 into the door frame 6, there has been proposed a structure in which a recess is provided in the side panel of the door frame 6. The recess extends continuously from a position where the grommet is fitted towards the passenger compartment. In this structure, the door harness is placed in the recess, and the recess is closed by the grommet.

However, the above structure requires a complex grommet structure and an increased number of components. As a result, the assembly of the door frame becomes complex and incurs additional costs.

SUMMARY OF THE INVENTION

In view of the above, an object of the present invention is to improve the wiring system of a door harness using a door module panel and to facilitate the operations of inserting the door harness into the door frame.

To this end, there is provided a door harness wiring system for a vehicle including a door frame and a door module panel. The door frame includes a side panel facing a body panel of the vehicle. The side panel includes a side face with a groove formed therein. The door module panel is configured to be attached to and detached from the door frame. The door module panel includes a first surface facing a passenger compartment, a second surface facing the door frame and a panel hole located below a level to which a window glass can move down. The door module panel is configured to receive a door harness while detached from the door frame.

The door module panel includes a side rim and a protruding member extending from a portion of the side rim toward the door frame along the same plane as the side panel side face.

The protruding member includes a harness hole configured to receive a part of the door harness inserted therethrough, with a grommet being initially or subsequently mounted around the part of the door harness and fitted into the harness hole.

The groove formed in the side face is configured to receive the protruding member therein in such a manner that when the door module panel is attached to the door frame, the protruding member fits into the groove along the same plane as the side panel side face.

Further, in the door harness wiring system of the present invention the door harness may have first and second portions. The first portion is wired on the first surface of the door module panel and connected to electrical door components, while the second portion passes through the panel hole toward the second surface of the door module panel. The second portion is further fitted with the grommet and is passed through the harness hole.

Further, in the door harness wiring system of the present invention the gap formed between the protruding member and the groove may be filled with sealing material, and a weather strip may be mounted in a longitudinal direction on the side face of the side panel of the door frame, in such a manner that the weather strip crosses over a surface of the protruding member of the door module panel and the harness hole is located outside the weather strip relative to the passenger compartment.

As mentioned above, the door module panel is provided with a protruding member projecting along the side panel of the door frame, while the protruding member includes a harness hole, through which the door harness is initially passed and fixed into the hole with a grommet. Therefore, as soon as the door module panel is fitted into and fixed to a grooved portion notched in the side panel of the door frame, the door harness can be drawn out from the door frame towards another body frame of the vehicle. In this manner, operations for inserting the door harness into the harness hole, which are usually very cumbersome, are carried out beforehand with a separate door module panel, so that such operations at a later stage can be dispensed with.

Further, the grommet mounted around the door harness is fitted into the harness hole of the door module panel, before the latter has been incorporated into the door frame. The harness-fitting operation is thus simple, and allows for the use of a common type of grommet.

Further still, this structure prevents a space from being formed on the side panel of the door frame, and subsequent water penetration resulting therefrom. Moreover, it does not hinder the waterproof function of a weather strip.

In another aspect of the present invention, there is provided a door module panel for a vehicle door frame. The door module panel is configured for assembly of a door harness thereon prior to attachment of the door module panel to a vehicle door frame. The door module panel includes a first surface, a second surface, a panel hole and a protruding member. The first surface faces a vehicle passenger compartment when the door module panel is attached to a vehicle door frame, and is configured for receipt of a first portion of a door harness thereon. The second surface is on an opposite side of the door module panel from the first surface. The panel hole extends through the door module panel from the first surface to the second surface, and is configured to receive a second portion of the door harness inserted therethrough. The protruding member extends from a side rim of the door module panel, and includes a harness hole extending therethrough. The harness hole is configured to receive a third portion of the door harness inserted therethrough and to receive a grommet mounted around the third portion of the door harness.

Further, in the door module panel of the present invention, the protruding member extends in a direction substantially perpendicular to the second surface on the same side of the door module panel as the second surface.

Further, in the door module panel of the present invention, the protruding member is configured to be received within a groove formed in a side panel of a door frame in such a manner as to be coplanar with the side panel.

In another aspect of the present invention, there is provided a method for assembling a door harness wiring system. The method includes providing a door module panel having a main panel portion with a first surface, a second surface and a main panel hole extending through the main panel portion from the first surface to the second surface. The door module panel also has a protruding panel portion extending from a side rim of the main panel portion with a protruding panel hole extending through the protruding panel portion. The method further includes attaching a first portion of a door harness to the first surface of the main panel portion, inserting a second portion of the door harness through the main panel hole, inserting a third portion of the door harness through the protruding panel hole, and mounting a grommet to the third portion of the door harness in such a manner that the grommet is fitted into the protruding panel hole.

The method of the present invention may further include attaching the door module panel to a vehicle door frame and inserting the protruding panel portion within a groove formed in a side panel of the door frame in such a manner as to be coplanar with the side panel.

The method of the present invention may further include filling a gap between the side panel groove and the protruding panel portion with a sealing material.

The method of the present invention may further include mounting a weather strip along the side panel of the door frame in such a manner that the weather strip crosses over a surface of the protruding panel portion of the door module panel.

BRIEF DESCRIPTION OF THE DRAWINGS

The above, and the other objects, features and advantages will be made apparent from the following description of the preferred embodiments, given as non-limiting examples, with reference to the accompanying drawings, in which.

DETAILED DESCRIPTION OF THE PREFERRED EMBODIMENTS

Figure 1:
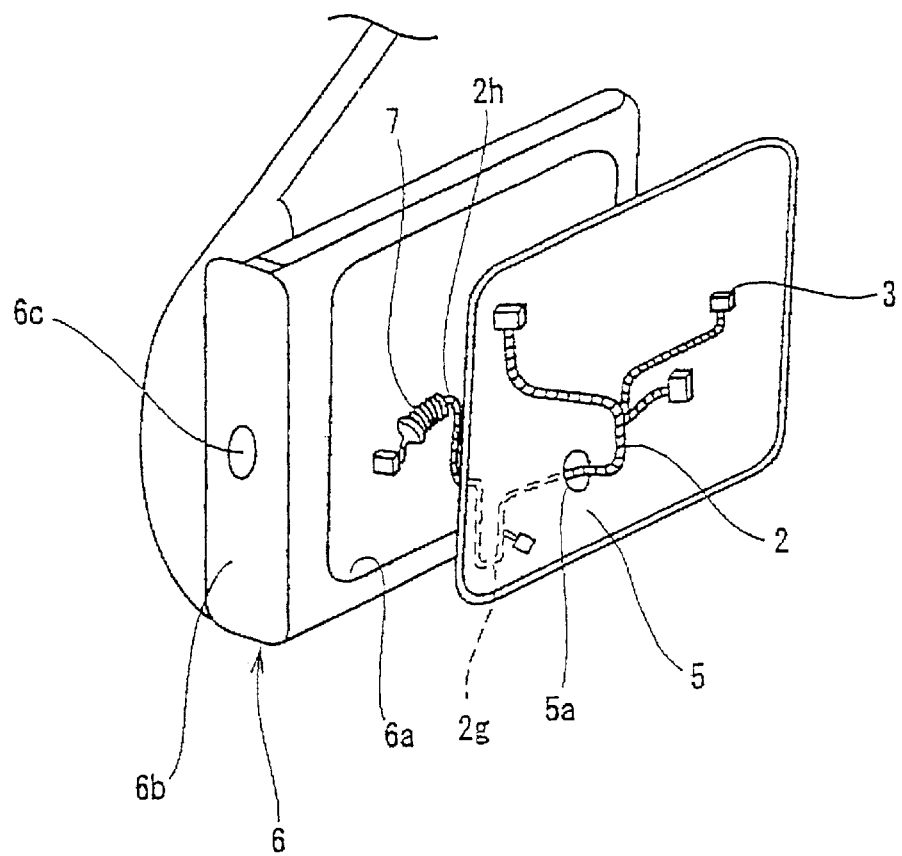
FIG. 1 is a perspective view of a prior art vehicle door frame.
Figure 2:
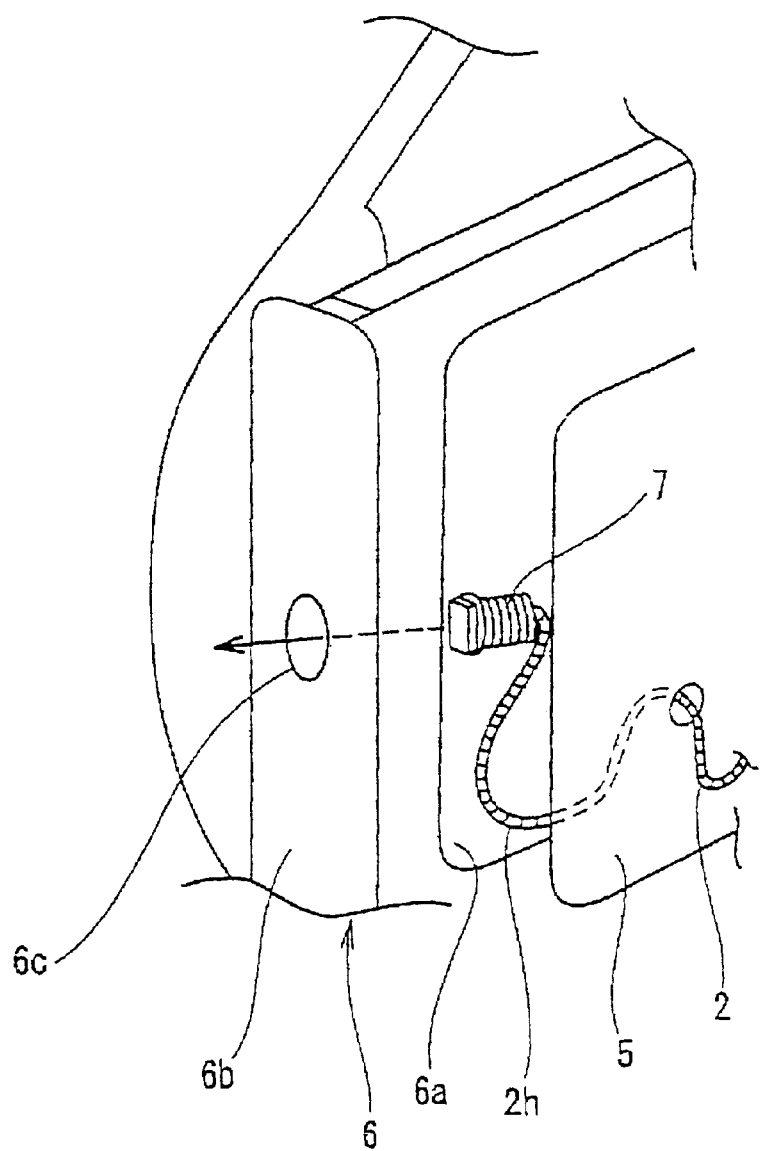
FIG. 2 is a perspective view showing the grommet inserting operation in the prior art vehicle door frame of FIG. 1.
Figure 3:
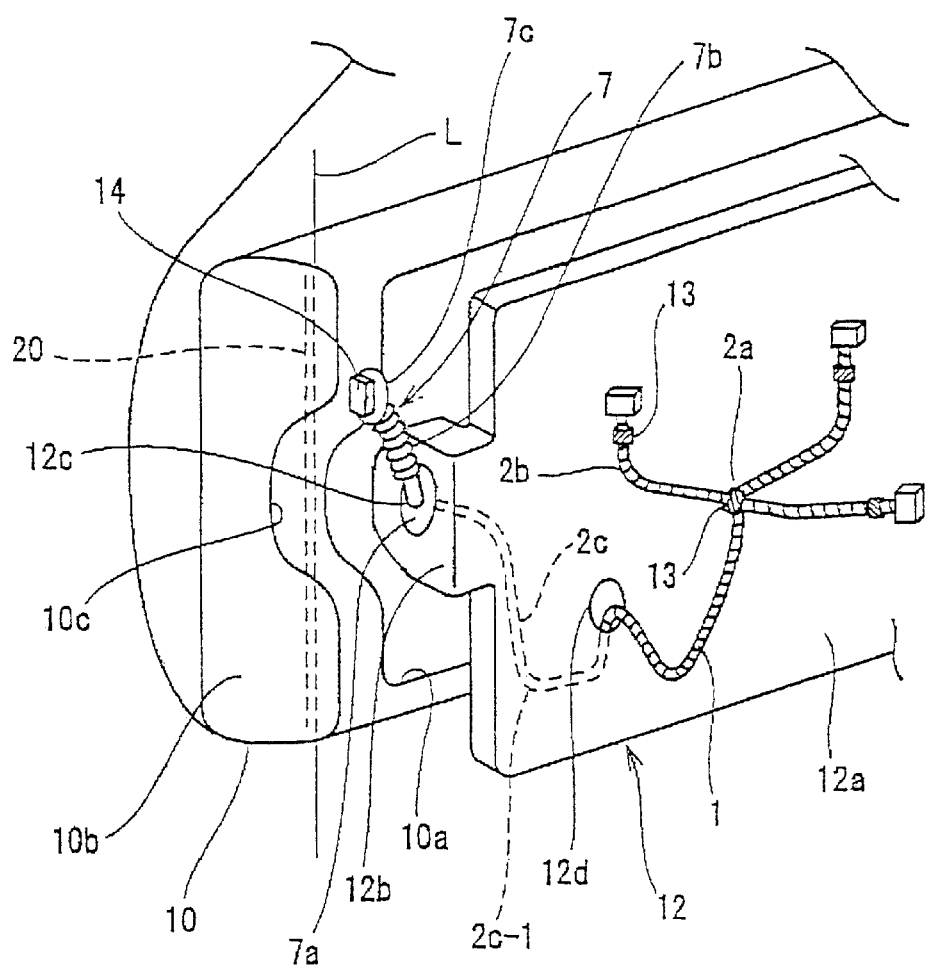
FIG. 3 is a perspective view of a door frame of the invention.

As shown in FIG. 3, the vehicle door frame 10 of the present invention may have a substantially flat parallelepiped shape, such as rectangular or square, and is provided with an opening 10a facing the passenger compartment, such that the opening 10a is configured to receive a door module panel 12. The door frame 10 includes a side panel 10b, which is substantially perpendicular to the plane which includes the opening 10a. The side panel 10b is formed with a groove or recess 10c therein. The groove or recess 10c may be notched towards the outside of the vehicle, with a depth exceeding the longitudinal line L extending on the side panel 10b, along which line L a weather strip 20 may later be adhered.

The door module panel 12 includes a main plate member or panel portion 12a which may have a shape generally corresponding to the shape of opening 10a for example, substantially rectangular or square shape. The door module panel 12 has a first surface facing the passenger compartment and a second surface facing the door frame, and is adapted to close the opening 10a of the door frame 10 with the second surface inside. The main plate member 12a is formed unitarily and in one piece with a protruding member 12b, which extends from a substantially middle portion of one side of the main plate 12a, and is bent towards the door frame 10 when mounted. The protruding member 12b fits into the groove or recess 10c formed in the side panel 10b, when the door module panel 12 is incorporated into the door frame 10. Of course, the protruding member 12b may be formed separately from the main plate member 12a and attached thereto in any suitable manner, for example by adhesive attachment.

The protruding member 12b is provided with a harness hole 12c, which may be placed outside of the longitudinal line L of a weather strip when mounted, as viewed from the passenger compartment.

A door harness 2 has a first portion 1 and a second portion 2c. The first portion 1 is wired on the first surface of the main plate member 12a of the door module panel 12. The first portion 1 of the door harness 2 includes a branching portion 2a and portions 2b adjacent the branched-ends, which are initially attached to the door module panel 12, for example, by clips 13. Likewise, electrical components (not shown in figures) for door devices are initially attached to the main plate member 12a.

The door module panel 12 is provided with a panel hole 12d near that side of the main plate member 12a where the protruding member 12b is provided, and in the lower portion of the main plate member 12a so as not to interfere with a descending window glass. The second portion 2c of the door harness 2 is passed through the panel hole 12d and extended towards the second surface of the door module panel 12. The second portion 2c includes an excess portion 2c-1. The tip of the second portion 2c is mounted with a grommet 7, and the whole assembly is inserted into the harness hole 12c. Alternatively, the grommet may be mounted around the tip after the latter has been passed through the harness hole 12c, as shown in FIG. 3.

The grommet 7 includes a hooking portion 7a through which the grommet is held by the harness hole 12c, and a corrugated tube 7b. The grommet 7 is passed through the harness hole 12c of the protruding member 12b, and the hooking portion 7a is initially sealed in the harness hole 12c. In this state, the corrugated tube 7b of the grommet 7 extends outwardly from the hooking portion 7a. The tip of the corrugated tube 7b is provided with a connector housing 7c containing a connector 14 linked to the tip of the door harness 2.

Figure 4A:
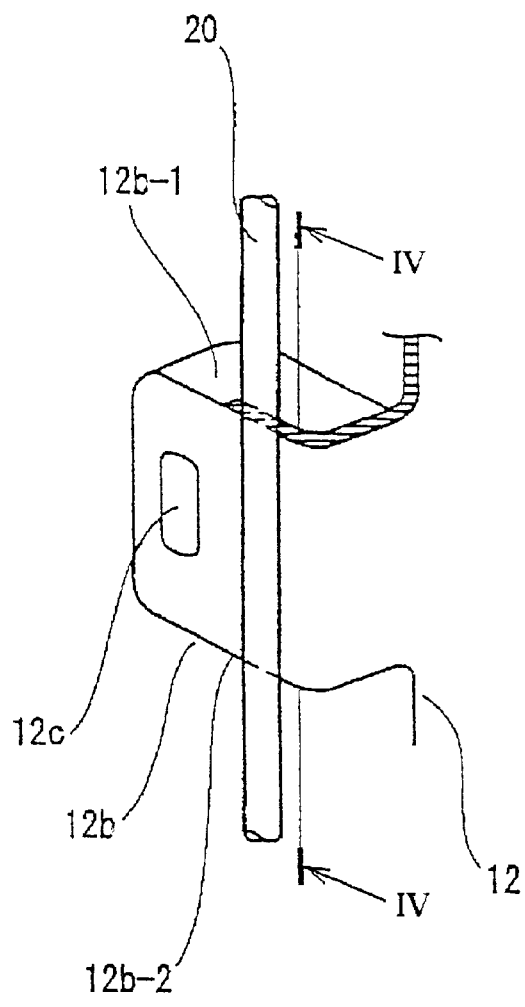
FIG. 4A is an enlarged perspective view of a main portion of the embodiment shown in FIG. 3.
Figure 4B:
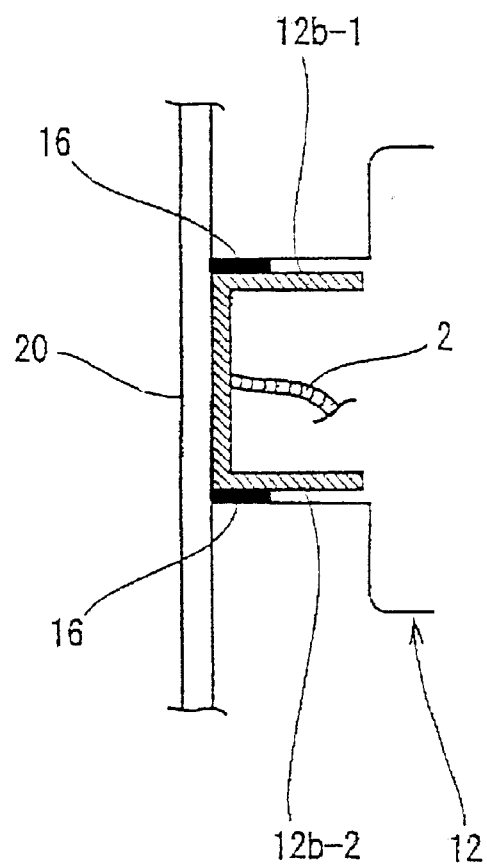
FIG. 4B is a cross-sectional view of the main portion of FIG. 4A, taken along line IV—IV of FIG. 4A.

The protruding member 12b of the door module panel 12 has an upper side face. 12b-1 and a lower side face 12b-2, when viewed in FIGS. 3, 4A and 4B. As shown in FIG. 4B, both faces are coated with a sealing agent 16 so that, when the protruding member 12b fits into the groove 10c of the side panel 10b, the sealing agent 16 fills the space between the protruding member 12b and the groove 10c and prevents water penetration. The sealing agent 16 may be any suitable material, such as a rubber or butyl sealing agent.

The door module panel 12 is incorporated into the door frame 10 such that the protruding member 12b fits into the groove 10c and the main plate member 12a closes the opening 10a. In this manner, by simply incorporating the door module panel 12 into the door frame 10, the door harness 2 is wired in the door, while the grommet 7 of the door harness 2 is placed in position for connection to another body frame of the vehicle.

After having been assembled as described above, the first surface of the door module panel 12 is covered with a trim plate (not shown in figures).

Further, after the door module panel 12 is incorporated into the door frame 10, the weather strip 20 is adhered on the side panel 10b along the longitudinal line L. In this manner, the grommet 7 of the door harness 2 is positioned outside the line L relative to the passenger compartment. If a gap is formed between the protruding member 12b and the groove 10c, particularly inside the longitudinal line L relative to the passenger compartment, it is filled with a sealing agent 16, to seal off water coming from outside.

By virtue of the above structure, a combined use of the door module panel 12 and the door frame 10 facilitates efficient operations of wiring the door harness 2 in the door frame 10 and of inserting the door harness 2 into the harness hole of the door frame 10.

As is clear from the above description, the door harness of the invention is initially mounted and wired in a door module panel. The latter includes a protruding member projecting towards the side panel of the door frame. The protruding member is provided with a harness hole, through which a grommet, mounted around the door harness, is held. Thereafter, by simply incorporating the door module panel into the door frame, the door harness can be wired in the door frame very efficiently, with that portion of the door harness to be connected to another body frame of the vehicle extending from the side panel of the door frame. By virtue of this door frame configuration, operations for wiring of the door harness to the vehicle door is greatly improved.

Further, the grommet fitted around the door harness may be of a type commonly used for harness holes. The cost of the grommet can thus be greatly reduced.

Further, gaps between the protruding member of the door module panel and the groove of the door frame may be filled with a sealing agent up to the position where the weather strip is attached, so that the waterproof quality of the door frame is further secured.

Although the invention has been described with reference to an exemplary embodiment, it is understood that the words that have been used are words of description and illustration, rather than words of limitation. Changes may be made within the purview of the appended claims, as presently stated and amended, without departing from the scope and spirit of the invention in its aspects. Although the invention has been described with reference to particular means, materials and embodiments, the invention is not limited to the particulars disclosed. Rather, the invention extends to all functionally equivalent structures, methods and uses such as are within the scope of the appended claims.

The present disclosure relates to subject matter contained in priority Japanese Application No. 2001-044967, filed on Feb. 21, 2001, which is herein expressly incorporated by reference in its entirety.

What is claimed:

1. A door harness wiring system for a vehicle, said door harness wiring system comprising:

a door frame, said door frame including a side panel facing a body panel of the vehicle, said side panel including a side face with a groove formed therein; and a door module panel configured to be attached to and detached from said door frame, said door module panel including a first surface facing a passenger compartment, a second surface facing said door frame and a panel hole located below a level to which a window glass can move down, said door module panel configured to receive a door harness while detached from said door frame;

said door module panel including a side rim and a protruding member extending from a portion of said side rim toward said door frame along the same plane as said side panel side face;

said protruding member including a harness hole configured to receive a part of the door harness inserted therethrough, with a grommet being one of initially and subsequently mounted around the part of the door harness and fitted into said harness hole;

said groove formed in said side face being configured to receive said protruding member therein in such a manner that when said door module panel is attached to said door frame, said protruding member fits into said groove along the same plane as said side panel side face;

wherein said door harness has first and second portions, said first portion being wired on said first surface of said door module panel and connected to electrical door components, said second portion passing through said panel hole toward said second surface of said door module panel, and said second portion being fitted with said grommet and passing through said harness hole.

2. The door harness wiring system according to claim 1, wherein a gap formed between said protruding member and said groove is filled with sealing material, and a weather strip is mounted in a longitudinal direction along said side face of said side panel in such a manner that said weather strip crosses over a surface of said protruding member of said door module panel and said harness is located outside of said weather strip relative to the passenger compartment.

3. A method for assembling a door harness wiring system, said method comprising:

providing a door module panel including a main panel portion having a first surface, a second surface and a main panel hole extending through the main panel portion from the first surface to the second surface, the door module panel also including a protruding panel portion extending from a side rim of the main panel portion and having a protruding panel hole extending through the protruding panel portion;

attaching a first portion of a door harness to the first surface of the main panel portion;

inserting a second portion of the door harness through the main panel hole;

inserting a third portion of the door harness through the protruding panel hole; and mounting a grommet to the third portion of the door harness in such a manner that the grommet is fitted into the protruding panel hole.

4. The method according to claim 3, further comprising:

attaching the door module panel to a vehicle door frame; and inserting the protruding panel portion within a groove formed in a side panel of the door frame in such a manner as to be coplanar with the side panel.

5. The method according to claim 4, further comprising:

filling a gap between the side panel groove and the protruding panel portion with a sealing material.

6. The method according to claim 4, further comprising:

mounting a weather strip along the side panel of the door frame in such a manner that the weather strip crosses over a surface of the protruding panel portion of the door module panel.

* * * * *